United States Patent
Kidman (10) Patent No.: US 7,959,700 B2
(45) Date of Patent: Jun. 14, 2011

(54) FILTER ORIENTATION RIBS

(75) Inventor: Beau Kidman, Kalamazoo, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 381 days.

(21) Appl. No.: 12/165,676

(22) Filed: Jul. 1, 2008

(65) Prior Publication Data

US 2010/0000190 A1 Jan. 7, 2010

(51) Int. Cl.
*B01D 46/00* (2006.01)
(52) U.S. Cl. ........... 55/497; 55/499; 55/502; 55/503; 55/504; 55/521; 55/DIG. 31; 210/493.3
(58) Field of Classification Search ............ 55/495, 55/497, 502, 503, 504, 499, 501, DIG. 31; 210/493.1, 493.3
See application file for complete search history.

(56) References Cited

U.S. PATENT DOCUMENTS

| | | | | |
|---|---|---|---|---|
| 5,509,950 A | * | 4/1996 | van de Graaf et al. | 55/486 |
| 5,531,892 A | * | 7/1996 | Duffy | 210/493.1 |
| 5,620,505 A | * | 4/1997 | Koch et al. | 96/134 |
| 5,792,229 A | * | 8/1998 | Sassa et al. | 55/497 |
| 5,840,094 A | | 11/1998 | Osendorf et al. | |
| 6,033,453 A | | 3/2000 | Weddell, III | |
| 6,319,300 B1 | * | 11/2001 | Chen | 55/497 |
| 6,447,587 B1 | | 9/2002 | Pillion et al. | |
| 6,860,916 B2 | * | 3/2005 | Kubokawa et al. | 55/495 |
| 6,955,702 B2 | * | 10/2005 | Kubokawa et al. | 55/499 |
| 7,004,989 B2 | * | 2/2006 | Karlsson | 55/497 |
| 7,150,774 B2 | | 12/2006 | Kubokawa et al. | |
| 7,247,182 B2 | * | 7/2007 | Boyer et al. | 55/429 |

* cited by examiner

Primary Examiner — Robert A Clemente
(74) Attorney, Agent, or Firm — James Hasselbeck (57) ABSTRACT

The present invention provides an orientation device for enforcing correct orientation of a pleated filter element during installation into a filter support frame or filter housing, for example an automotive air cleaner. The orientation device includes at least one substantially rigid orientation rib positioned and mounted to have a portion of the rib extending between adjacent pleats of the pleated filter when the pleated filter is in an installed position. The orientation rib is positioned and mounted to block against at least a portion of the pleats of the filter element when the filter element is in an incorrect orientation, thereby preventing installation of the filter element.

12 Claims, 7 Drawing Sheets

FILTER ORIENTATION RIBS

TECHNICAL FIELD

The present invention relates to pleated filter elements and, more particularly, to devices for enforcing correct orientation of a pleated filter element during installation.

BACKGROUND OF THE INVENTION

Pleated filter panel elements are widely used in automotive as well as residential and commercial building HVAC applications, among others. Pleated filter elements are typically produced by corrugating or pleating one or more flat sheets of filter media, such as filter paper and then securing the pleats sheets into a periphery seal member. Pleating the filter element is advantageous as it increases the effective filter surface area for a given dimensional size of filter. The presence of pleats in the filter element also provides additional structural strength to resist forces such as those applied to the filter element by a fluid stream passing through the pleated filter element.

One typical application for pleated filter panel elements is in filtering an air stream, such as an intake combustion air stream to an internal combustion engine. Additional common applications for pleated air filter elements include use in motor vehicle cabin air filters as well as heating/cooling system air filtering for commercial and residential applications. In automotive combustion air filtering applications, such filtering elements are often installed into a housing having two halves that may be separated so as to access the housing interior and replace the filter element when necessary. The pleated filter panel element often includes a resilient seal member secured to periphery edges of the filter element. The seal member is often sized and shaped to be received into and sealably engage with a support ledge provided in the filter housing, thereby providing a seal between the filter element and the housing to prevent the air stream from bypassing the filter in any open space between the filter housing and the filter element. In applications where a filter housing is not utilized, a filter support member such as a filter support frame may be provided to receive the filter element, for example when an air filter is installed in an air duct for a building HVAC application.

When a pleated filter element is utilized in automotive engine air induction system applications, the filter may be required to be installed into a specified orientation (oriented with the pleat folds aligned in a specified direction). In certain cases the dimensions of a rectangular panel pleated air filter element may permit the pleated filter element to be physically installed into the filter housing or support frame even when filter is incorrectly oriented (for example, with the filter pleat folds rotated 90 degrees out of the correct installation orientation). In applications where a specified orientation of the filter pleats is important, the requirement for a specific filter orientation may not always be readily apparent to the person installing the filter, especially when the filter element dimensionally approximates a square. In some cases the shape and dimensions of the filter may be such that the filter can be forced to install into the housing or support frame an incorrect orientation. One drawback of an incorrectly oriented filter element is that it may not seal correctly into the filter housing, thereby allowing an unfiltered portion of the fluid stream to bypass the filter and carry contaminants into the clean side of the filter.

It is known in the current art to indicate the filter orientation for installation by providing special orientation features directly on the air filter element itself that mate with complimentary features in the support frame or filter housing. Conventional types of orientation features include special orientation features on the filter such as notches or tabs that are sized and configured to mate with corresponding complimentary features in the support frame or housing. These known approaches to enforcing filter orientation during filter installation are not always effective as they rely upon orientation features formed into the gasket of the filter element, which is typically a soft, pliable and easily deformed material. Necessarily, the filter gasket material is soft by design in order to provide a seal between the filter element and the support frame or filter housing. Filter orientation features formed into the gasket material of the filter results in a unreliable orientation feature because the end user can physically overcome the orientation features and cause the filter to install into an incorrectly orientated position. An incorrectly oriented filter may not even be apparent to the installer due to the weakness of orientation features that are built using the pliable filter gasket or seal material to guide orientation.

Also known in the art are filter elements in which the pleated filter media core is replaceably installed onto a reusable support rack member. The support rack member includes a plurality of comb-like spacer elements (typically one for every filter pleat) that configured and positioned to be received between the pleats of the pleated media and thereby provide support to the pleated media.

U.S. Pat. No. 5,840,094 discloses a filter assembly including first and second frame members, a filter element, and separate comb-like spacers for retaining the filter pleats in an open spaced manner.

U.S. Pat. No. 6,033,453 discloses a reusable frame support rack for supporting and retaining an outstretched, replaceable pleated media filter core. The frame includes a pair of longitudinal angles extending between a pair of transverse angles which carry a flat expanded metal support or reinforcement system.

Additionally, a filter element that is installed in an incorrect orientation has other undesirable effects, particularly when utilized in an automotive air induction system air filter. Specifically, an automotive engine air induction system typically includes a flow sensor known as a Mass Air Flow Sensor (MAF). The MAF is typically located after the clean side of the filter and before the engine intake air manifold. The Mass Air Flow Sensor (MAF) provides a primary measurement of the flow rate of air into the engine through the air induction system. The measured air flow rate is utilized and relied upon by the Engine Control Unit (ECU) computer to accomplish regulation of the quantity of fuel injected into cylinders of the engine. An incorrect orientation of the pleats of a pleated air filter alters the air flow pattern seen by the MAF sensor. This altered air flow pattern may result in an error in the air flow measurement reported by the MAF sensor to the ECU, thereby affecting the ratio of fuel to air delivered to the engine and undesirably resulting in non-optimum engine operating performance and increased emissions.

Therefore, a need remains for a device to enforce correct orientation of a filter element during installation and to resist installation of an incorrectly oriented filter element. Additionally a need also remains for a device that reliably indicates to a technician when a filter element is incorrectly oriented during installation so that corrective action can be taken.

SUMMARY OF THE INVENTION

The present invention provides an orientation device for enforcing correct orientation of a pleated filter element during installation into a filter support frame or filter housing, such as (for example) an automotive air cleaner. The orientation device includes at least one substantially rigid orientation rib positioned and mounted to have a portion of the rib extending between adjacent pleats of the pleated filter when the pleated filter is in an installed position. The orientation rib is positioned and mounted to block against at least a portion of the pleats of the filter element when the filter element is in an incorrect orientation during installation of the filter element.

In one aspect of the invention, a filter orientation device includes at least one orientation rib positioned and mounted such that a portion of the rib extends inwards between adjacent pleats of the pleated filter when the pleated filter is in an installed position. The orientation ribs are positioned and mounted to block against at least a portion of the pleats of the filter element when the filter element is in an incorrect orientation, thereby blocking or resisting installation of an incorrectly oriented filter element.

In another aspect of the invention the orientation ribs include at least one pair of orientation ribs, each rib of a pair aligned to share a common orientation rib elongation axis.

In another aspect of the invention, the orientation device is configured to inhibit installation of the filter element when an angle between the fold axis of the filter pleats and the elongation axis of the orientation ribs is between 10 to 170 degrees.

In yet another aspect of the invention, the orientation device is mounted to an automotive air filter housing, wherein the housing is sized and configured to sealably receive the filter element when the filter element is correctly oriented in the installed position and wherein the orientation device enforces correct orientation of the filter element in the filter housing.

The above features and advantages together with other features and advantages of the present invention are readily apparent from the following detailed description of the best modes for carrying out the invention when taken in connection with the accompanying drawings.

DESCRIPTION OF THE PREFERRED EMBODIMENTS

Figure 1A:
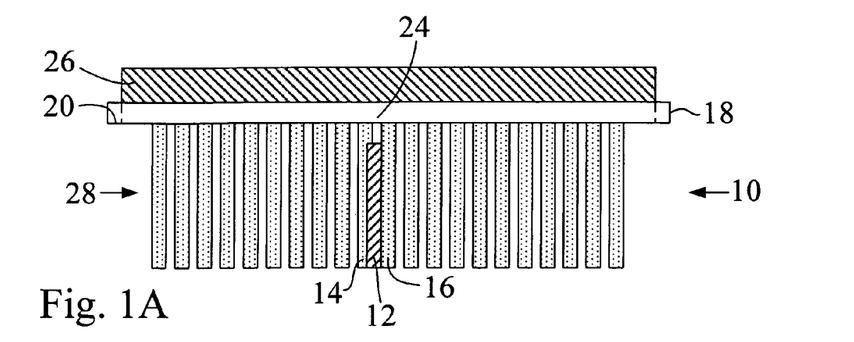
FIG. 1A illustrates a schematic side view of a pleated panel filter element correctly oriented in an installed position and an orientation rib extending from outside the filter into space between adjoining pleats of the filter, consistent with the present invention.

FIG. 1A illustrates a schematic side view of a pleated panel filter element 10 correctly oriented into an installed position relative to orientation ribs 12 (only one visible in FIG. 1A) extending from outside the filter element 10 into empty space 24 between adjacent pleats (14, 16) of the filter element 10 consistent with the present invention. It is to be understood that any number of orientation ribs 12 may be provided. The pleated panel filter element 10 is illustrated as positioned inside the periphery of seal ledge 20. As is known to those skilled in the art, the seal member 26 of filter element 10 is typically sized and configured to sealably engage with the seal ledge 20 when the filter element 10 is in the installed position. Orientation rib 12 (only one visible in FIG. 1A) has one portion of the rib mounted outside the periphery of the filter element pleats 28 at a position fixed relative to the seal ledge 20. In practice, the seal ledge 20 may be secured to the filter support frame or to the filter housing. The orientation rib 12 might then be secured to the frame or housing, thereby fixing the mounted position of the orientation rib 12 relative to the seal ledge 20. The orientation rib 12 extends in an inwards direction from the mounted portion of the orientation rib so as to interpose into free space 24 between a pair of the pleats 28 of filter element 10 when the filter element 10 is in the installed position (FIG. 1A illustrated position).

Figure 1B:
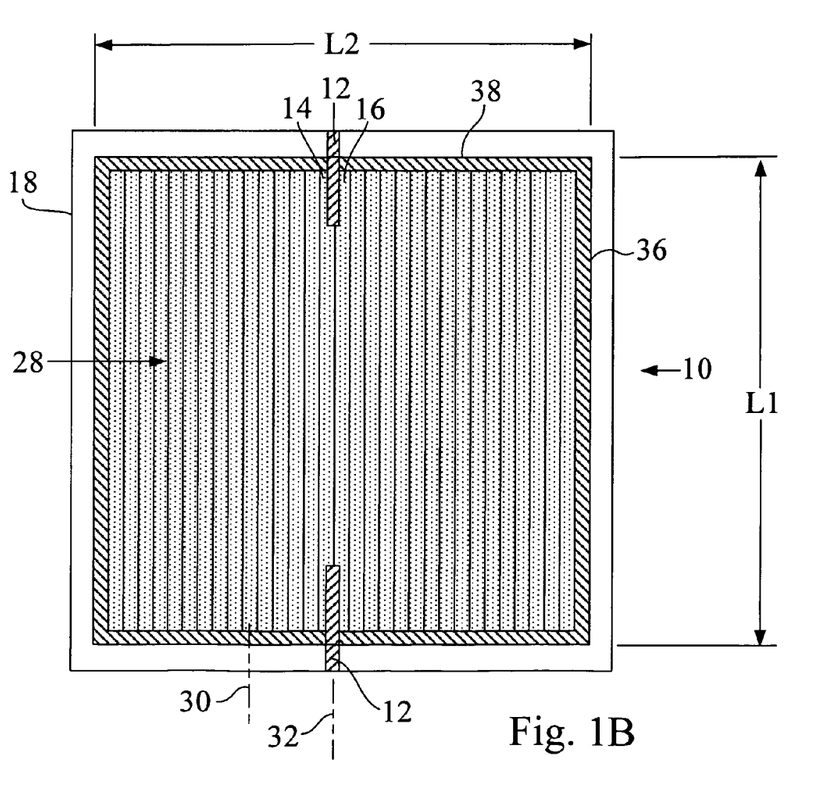
FIG. 1B illustrates a schematic bottom view of the pleated panel filter of FIG. 1A correctly oriented in an installed position, together with orientation ribs extending from outside the filter into space between adjoining pleats of the filter, consistent with the present invention.

FIG. 1B illustrates a schematic bottom view of the pleated panel filter element 10 together with orientation ribs 12 as illustrated and discussed with FIG. 1A. As in FIG. 1A, FIG. 1B illustrates the pleated panel filter element 10 correctly oriented relative to installation ribs 12. In FIG. 1B the fold axis 30 is representative of the alignment of the folds of the filter media pleats 28. Within this disclosure the elongation axis 32 of the orientation ribs 12 is taken to be the direction of elongation of the orientation ribs 32 when projected onto a plane defined by the seal ledge 18. Correct orientation, as defined in this disclosure, is achieved when the fold axis 30 of the filter media pleats, particularly adjacent pleats 14, 16 is generally parallel to the elongation axis 32 of the orientation ribs 12 such that the orientation ribs 12 may engage the pleated filter element 10 between adjacent pleats (14,16). When this occurs, the filter element 10 is defined as correctly oriented with respect to the orientation ribs 12. The installed position, as defined within this disclosure, is achieved when the filter element 10 is correctly oriented with respect to the orientation ribs 12 and the seal member 26 (see FIG. 1A) is in full periphery contact with the seal ledge 20 (see FIG. 1A). As illustrated in FIG. 1B, orientation ribs 12 are preferably installed pairs positioned near opposing sides 38,42 of the filter element 10 and aligned so as to interpose between the same two adjacent filter media ribs (14, 16).

Figure 1C:
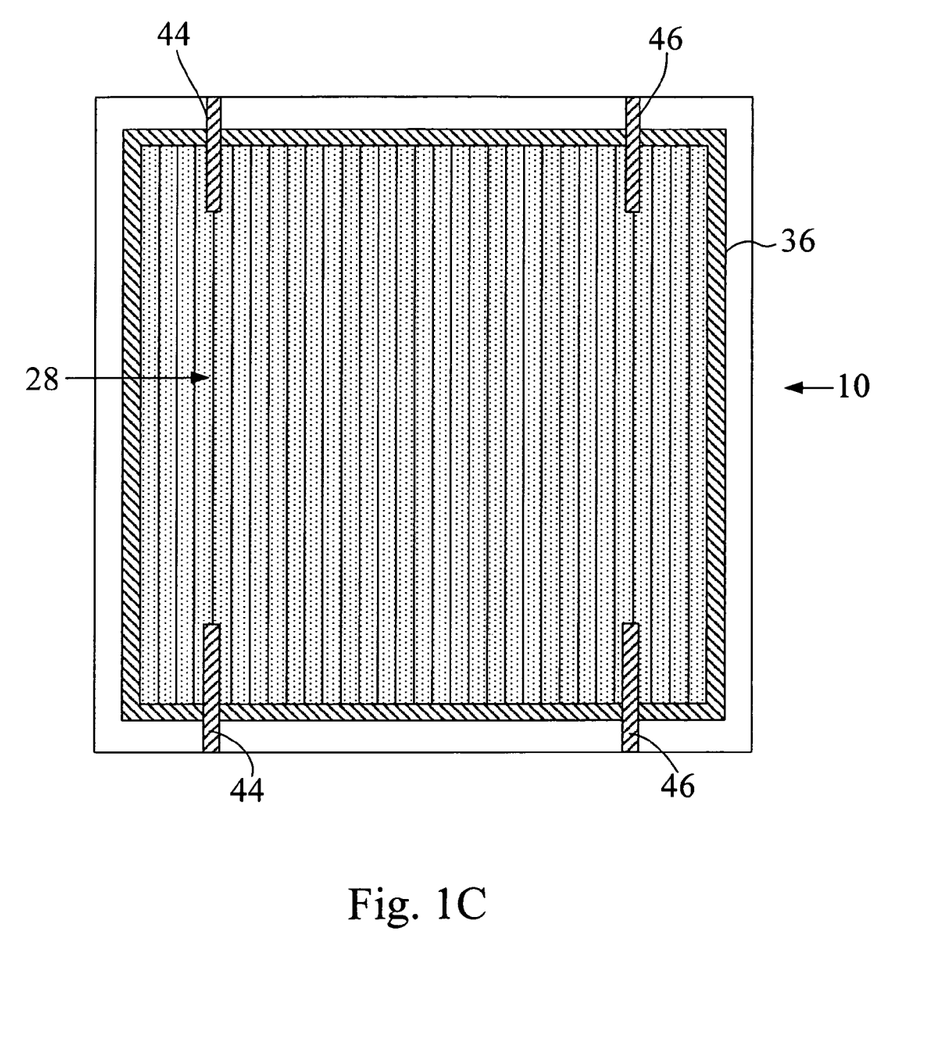
FIG. 1C illustrates a preferred quantity and positioning of orientation ribs, consistent with the present invention.

As illustrated in FIG. 1C, it is preferable that two distally spaced orientation rib pairs (44, 46) be utilized to ensure correct orientation of the filter element 10. Preferably each pair of ribs (44 or 46) are positioned such that both ribs of a given pair would are aligned so as to be received into free space between the same two adjacent pleats, that is they are aligned to share the same elongation axis 32 (see FIG. 1B and discussion with FIG. 1B).

Referring back to FIG. 1B, filter element 10 may have a first length dimension L1 relative to a first filter side 36 and a second length dimension L2 relative to a second filter side 38. In practice, it may happen that dimension L1 may be close enough in value to dimension L2 such that filter element 10 might be urged to install into support frame 18 in an incorrect orientation were it not for the presence of the orientation ribs 12 of the present invention.

As discussed earlier, an incorrectly oriented filter element may not form a complete periphery seal between the seal member 26 of the filter element 10 and the seal ledge 20 with the undesirable effect that an unfiltered portion of the fluid stream may bypass the filter element 10, allowing contaminants in the unfiltered fluid stream to be carried past the filter element 10.

As discussed in the background, a filter element that is installed in an incorrect orientation has other undesirable implications, particularly in automotive engine air induction system applications. Automotive engines typically utilize a flow sensor known as a Mass Air Flow Sensor (MAF) located after the clean side of the filter and before the engine intake air manifold. The Mass Air Flow Sensor measures the flow rate of air into the engine through the air induction system. An incorrect orientation of the pleats 28 of a pleated air filter 10 alters the air flow pattern seen by the MAF sensor. As a result, the air flow measured and reported by the MAF sensor may be inaccurate; this inaccuracy affecting the ratio of fuel to air delivered to the engine and undesirably affects the resulting operating performance and emissions characteristics of the engine.

The disclosed invention is not limited to use with rectangular or square shaped panel filters, nor to use with filters in which the fold axis 30 is generally aligned with one of the filter sides (for example side 36 in FIG. 1B). For example, it is envisioned that this invention may be applied with filters having a generally circular shape rather than rectangular shape, as well as used with filter elements in which the fold axis 30 is not substantially parallel to any of the sides 36, 38 of the filter element 10.

Figure 2A:
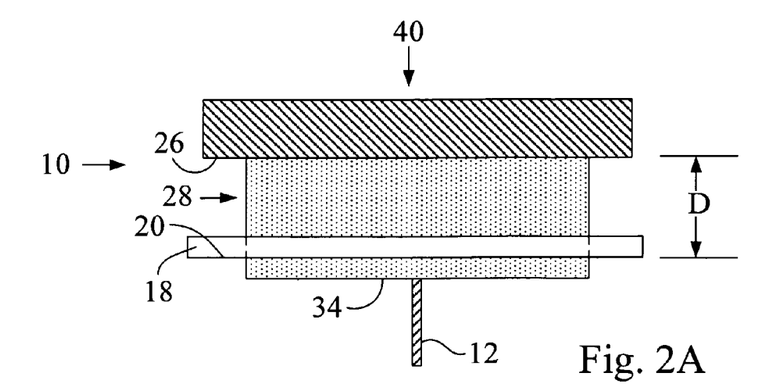
FIG. 2A illustrates a schematic side view of a pleated panel filter element that is incorrectly oriented and an orientation rib extending from outside the filter contacting filter media pleats of the filter element, the orientation rib preventing the incorrectly oriented filter from being fully installed, consistent with the present invention.
Figure 2B:
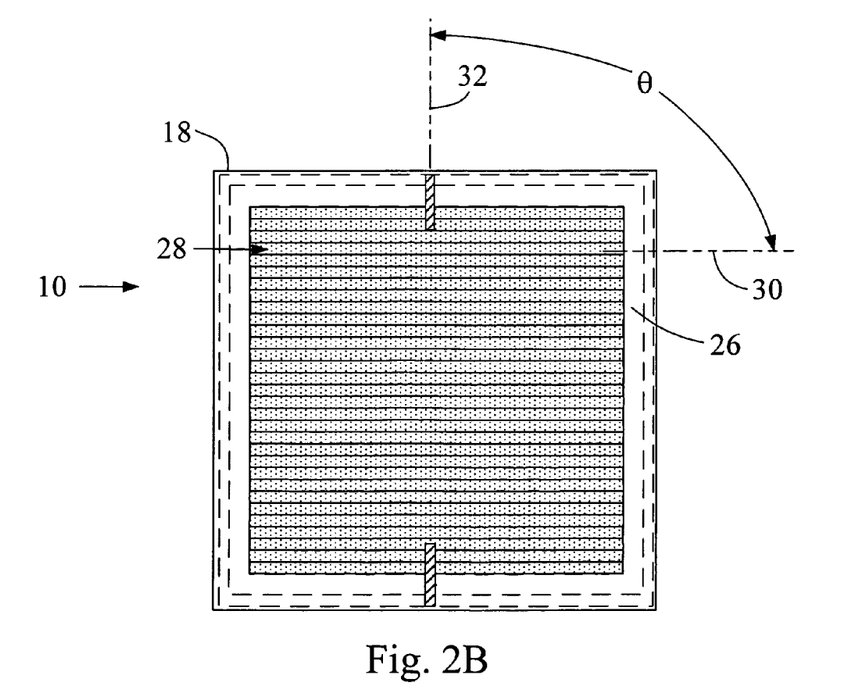
FIG. 2B illustrates a schematic bottom view of the incorrectly oriented pleated panel filter of FIG. 2A and orientation ribs contacting a portion of the pleats of the filter element, preventing the incorrectly oriented filter from being fully installed, consistent with the present invention.

For a better understanding of the invention, the discussion is now directed to FIGS. 2A and 2B. FIG. 2A illustrates a schematic side view of a pleated panel filter element 10 incorrectly oriented for installation onto seal ledge 20 of a support frame 18. FIG. 2A further illustrates orientation ribs 12 (only one visible) extending from a region outside the periphery of the filter element 10 and extending inwardly (into the page) to contact and block a lower edge 34 of the filter media pleats 28, thereby advantageously resisting further movement of filter element 10 in direction 40, preventing installation of the pleated panel filter element 10 into the installed position (discussed with FIG. 1A). The blocking contact of the orientation ribs 12 against the lower edge 34 of the pleats resists positioning of the seal member 26 onto the seal ledge 20 of the support frame 18, with the result that the filter element 10 is maintained at least an offset distance D away from its normal installation position. Advantageously, as the orientation ribs 12 prevent fully seating the filter element 10 into its installed position, this offset distance provides a positive indication to the technician that the filter element 10 is incorrectly oriented and needs to be reoriented for correct installation.

FIG. 2B illustrates a schematic bottom view of the pleated panel filter element 10 and support frame 18 of FIG. 2A. In contrast to FIG. 1A, in FIG. 2B the fold axis 30 of the pleats 28 is no longer angularly aligned with the elongation axis 32 of the orientation ribs 12. With the filter element in this orientation, the orientation ribs 12 are unable to be interposed into free space between the pleats 28 due to the fact that the orientation ribs 12 bridge across a plurality of pleats 28 rather than interpose into free space 24 between pleats (see FIG. 1A). Although in FIG. 2B the angle θ taken between the elongation axis 32 of the orientation ribs 12 is approximate ninety degrees, it is anticipated that any angular difference θ of between ten and one hundred and seventy degrees would be sufficient to obstruct installation of an incorrectly oriented pleated filter element.

Figure 3A:
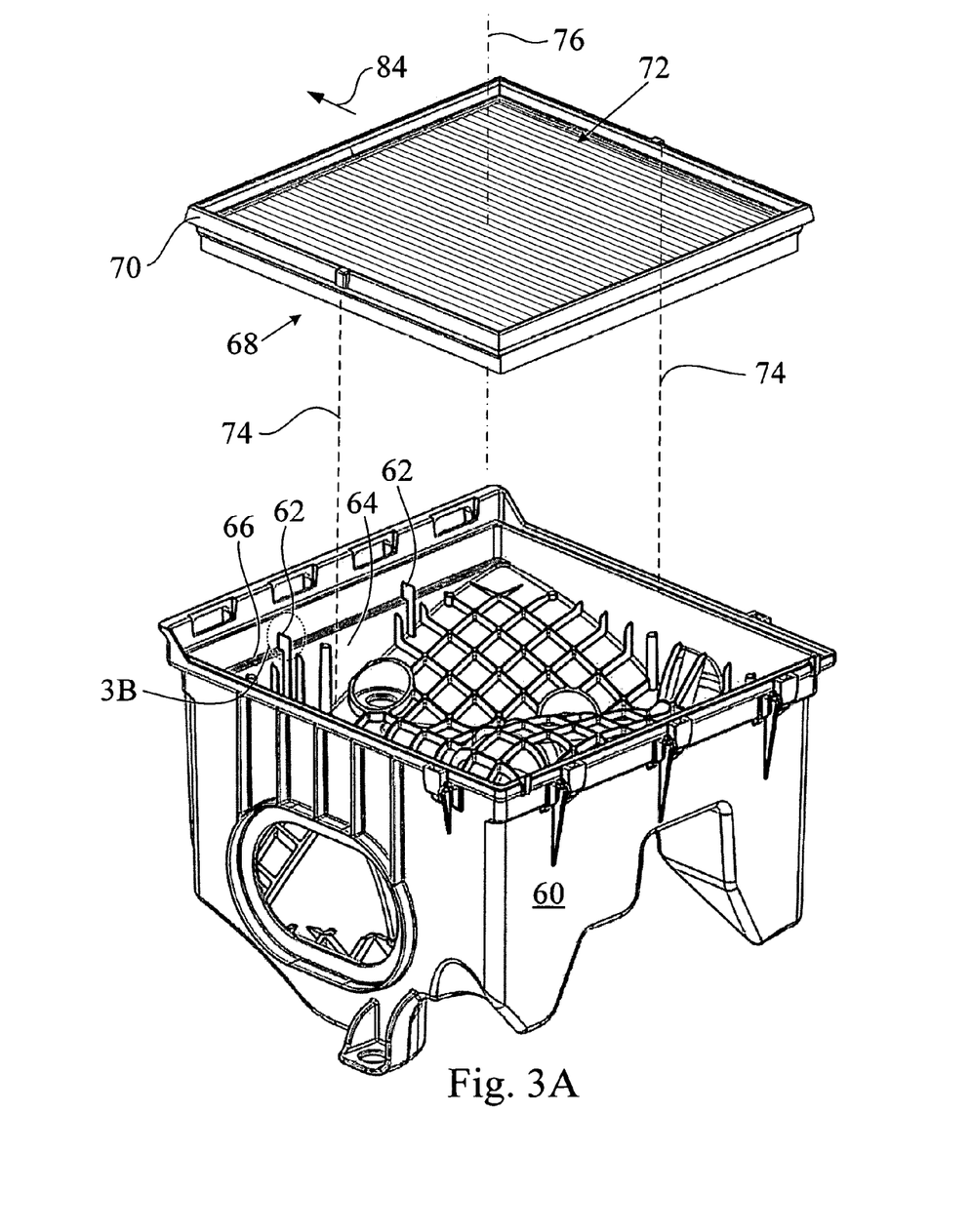
FIG. 3A illustrates a perspective view of one embodiment of filter housing and pleated panel filter, the filter housing incorporating the orientation device consistent with the present invention.
Figure 3B:
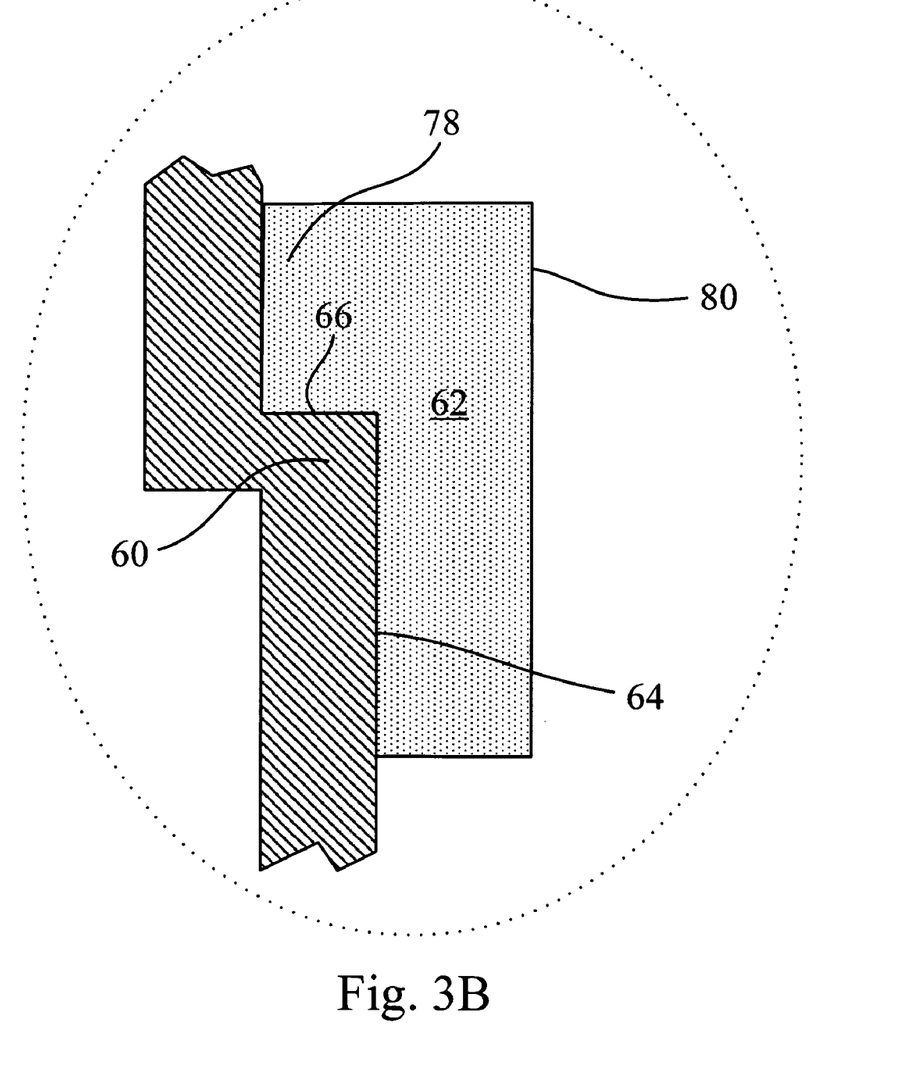
FIG. 3B illustrates an sectional view of region 3B of FIG. 3A, depicting one of the orientation ribs secured to the filter housing, consistent with the present invention.

For further understanding of the features of the present invention, the discussion now turns to FIGS. 3A and 3B. FIG. 3A illustrates an exploded perspective view of one embodiment of filter housing 60 incorporating the orientation device consistent with the present invention. Illustrated specifically is a filter housing 60 for an automotive engine air induction system (not shown). Also illustrated is a complimentary pleated panel filter 68 having a pliable seal member 70 and filter media pleats 72 for the automotive air induction system. The example filter housing 60 is generally cubic plastic air filter housing have four sidewalls in opposing relationships spaced and configured to receive an approximately square filter panel filter elements 72. Filter housing 60 includes a plurality of orientation ribs 62 secured to an interior sidewall 64, thereby mounted in a position relative to seal ledge 66. The orientation ribs 62 may be formed onto or molded with the housing 60, may be adhesively secured onto the housing 60. The orientation ribs 62 may also be provided on the filter housing 60 by overmolding the orientation ribs 62 onto the housing 60. The orientation ribs 62 may alternately be secured to the filter housing 60 by clamping the orientation ribs 62 to the housing 60 or may alternately be secured to the housing 60 using any method as would be known to one skilled in the art. The orientation ribs 62 are positioned and configured to extend upwardly and inwardly from the seal ledge 66, positioning portions of the orientation ribs 62 in position to engage into free space between adjacent pleats of pleated panel filter element 68. Pleated panel filter 68 is sized and configured to be installable into filter housing 60 as shown by 74 in a correct orientation in which the folds of the pleats 72 are aligned generally parallel to the elongation axis of the orientation ribs 62, as previously illustrated and discussed with FIGS. 1A and 1B.

Although not illustrated, if the pleated panel filter element 68 is caused to rotate 90 degrees about axis 76 when installing into filter housing 60, the filter would be incorrectly oriented. In this hypothetical position the orientation ribs 62 would not align with the direction 84 of the folds in the pleats, causing the orientation ribs to contact the lower edge of the pleats (as discussed earlier with FIGS. 2A and 2B), thereby preventing complete installation of the panel filter 68 into the filter housing 68.

FIG. 3B illustrates a detail sectional view of region 3B as identified in FIG. 3A. FIG. 3B depicts an example of one of the orientation ribs 62 secured onto the filter housing 60. In FIG. 3B orientation rib 62 has a first portion 78 positioned and mounted to the filter housing interior sidewall 64, thereby serving as a support member for orientation rib 62 and fixing the position of the orientation rib 62 relative to the seal ledge 66. Orientation rib 62 has a second portion 80 extending inwardly in a direction towards the filter element 68 (see FIG. 3A) when the filter element 68 is in the installed position.

Figure 3C:
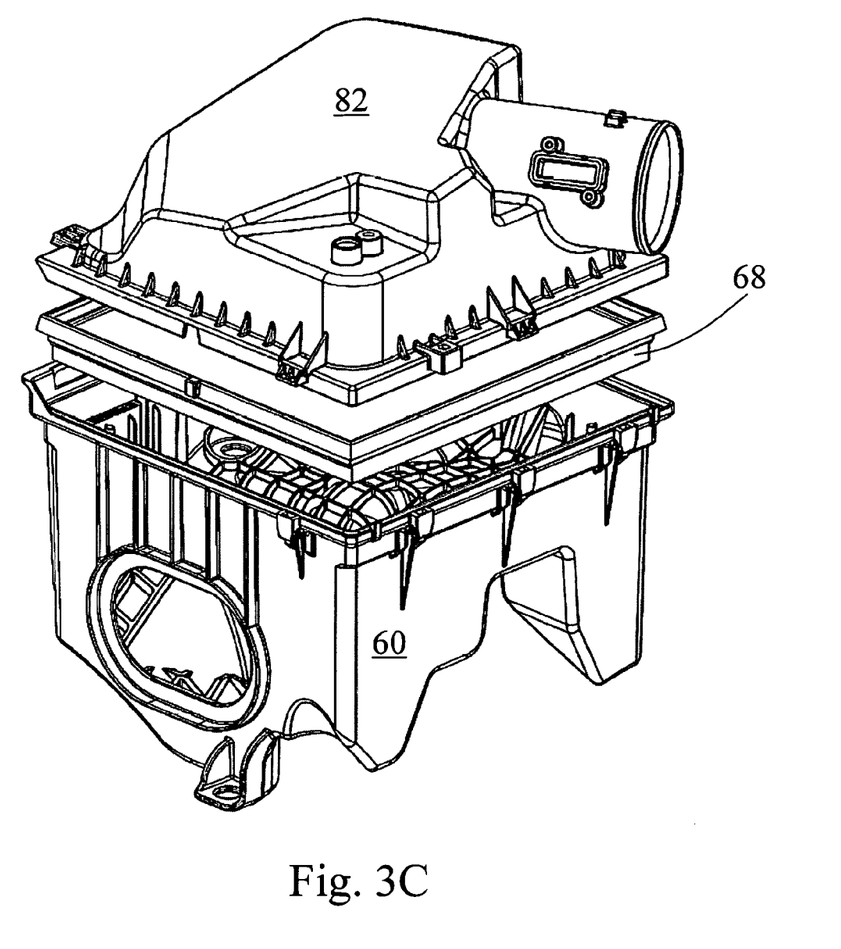
FIG. 3C illustrates an assembly view of the filter housing, filter cover and filter element of FIG. 3A.
Figure 3D:
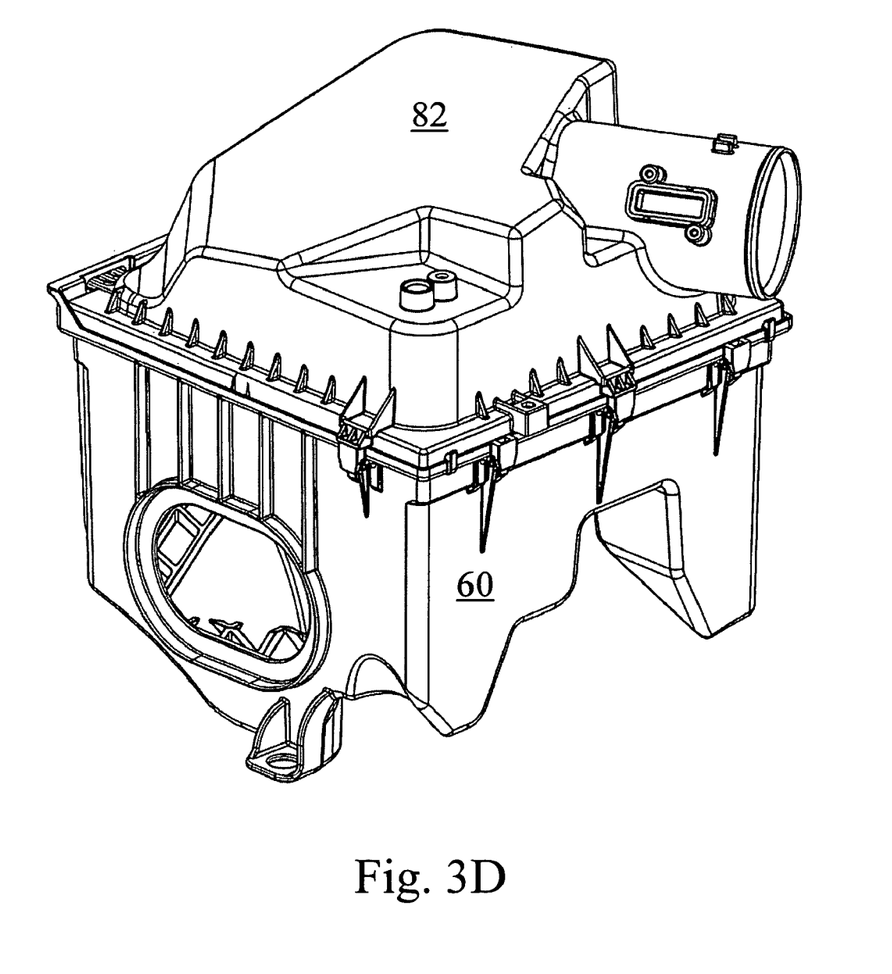
FIG. 3D illustrated the filter housing cover sealably closed onto the filter housing after filter element is correctly oriented and installed into the filter housing.

FIG. 3C depicts an exploded assembly view of the filter housing 60 and pleated panel filter element 68, both as discussed previously with FIG. 3A. When the filter element 68 is correctly oriented, the filter element 68 can achieve complete installation into the filter housing 60, thereby permitting the filter housing cover 82 to be closed onto the filter housing 60 as illustrated in FIG. 3D.

As discussed earlier, if the filter element 68 is instead incorrectly oriented, the interaction of the orientation ribs (see FIG. 3A, element 62 and FIG. 2A element 12) against the lower edge of the pleats 12 (see FIG. 2A) of filter element 68 (see FIG. 3C) prevent the complete installation of the filter element 68 into the filter housing 60 (filter element extended above seal ledge by distance D as shown and discussed with FIG. 2A), thereby resisting the closure of filter housing cover 82 onto the filter housing 60 providing positive indication to the technician that the filter is improperly aligned.

Advantageously, the orientation device of the present invention relies upon engagement of the orientation ribs into free space present between adjacent pleats in the filter media for determination of a correctly aligned filter element. Advantageously, well known and widely available pleated filter elements can continue to be used with and oriented by the present invention. Advantageously, the invention does not require any modifications to the pleated filter elements to achieve the orientation features discussed with this invention.

While the best modes for carrying out the invention have been described in detail, those familiar with the art to which this invention relates will recognize various alternative designs and embodiments for practicing the invention within the scope of the appended claims.

The invention claimed is:

1. A filter orientation device for enforcing correct orientation of a pleated filter element during installation comprising:
    a support member including a plurality of side members and a substantially open interior to said side members;
    at least one orientation rib positioned and mounted to said side member, a portion of said rib extending between adjacent pleats of said pleated filter when said pleated filter is in an installed position,
    said at least one orientation rib positioned and mounted to block against at least a portion of said pleats of said filter element when said filter element is in an incorrect orientation in said installed position,
    said blocking resisting installation of said pleated filter element when incorrectly oriented;
    wherein said at least one orientation rib is at least one pair of orientation ribs,
    wherein for each pair, said ribs in the pair are not mounted to the same side member;
    wherein said orientation ribs are not connected to other ones of said orientation ribs;
    wherein each rib of said pair is positioned and aligned to extend between a same set of said adjacent pleats of said filter element when said filter element is in said correctly installed position.

2. The filter orientation device of claim 1, wherein said at least one pair of ribs are aligned to share a common orientation rib elongation axis.

3. The filter orientation device of claim 1, wherein said orientation ribs inhibit installation of said filter element when an angle θ between a fold axis of said filter pleats and an elongation axis of said orientation ribs is between 10 to 170 degrees.

4. The filter orientation device of claim 1,
    wherein said support member supports said filter element in said installed position;
    wherein said at least one orientation rib has a first portion mounted to said support member and a second portion extending towards said filter element when said filter element is in said installed position.

5. The filter orientation device of claim 4, wherein
    said filter element comprises:
        at least one sheet of pleated filter media; and
        a seal member secured to periphery portions of filter media;
    wherein said support member comprises:
        a frame having a plurality of side members and a substantially open interior,
        said side members and configured to sealably engage with portions of said seal member when said filter element is correctly oriented in said installed position.

6. The filter orientation device of claim 4, wherein
    said side members are configured to sealably engage with portions of said filter element when said filter element is correctly oriented in said installed position.

7. The filter orientation device of claim 6, wherein
    said support member is a component of a filter housing,
    said filter housing sized and configured to sealably receive said filter element into said filter housing when said filter element is correctly oriented in said installed position.

8. The filter orientation device of claim 7, wherein
    said filter housing is an automotive air filter housing.

9. The filter orientation device of claim 8 further comprising
    a filter housing cover, said filter housing cover closable onto said filter housing when said filter element is installed into said filter housing in said correct orientation,
    said orientation ribs preventing closure of said filter cover upon said filter housing by at least one of said orientation ribs blocking against a lower edge of said pleats when said filter element is in said incorrect orientation in said filter housing.

10. The filter orientation device of claim 9 wherein said orientation ribs are injection molded together with said filter housing.

11. A filter housing for a pleated filter element comprising:
    said filter housing having a plurality of opposing sidewalls;
    at least one seal ledges formed onto a portion of said sidewalls;
    at least one seal member secured to periphery portions of said pleated filter element,
    said at least one seal member configured to sealably engage with portions of said seal ledges when said filter element is correctly oriented in an installed position;
    at least one orientation rib positioned and mounted onto said sidewalls to have a portion of said rib extending between adjacent pleats of said pleated filter when said pleated filter is in a correctly installed position,
    said at least one orientation rib positioned and mounted to block against at least a portion of said pleats of said filter element when said filter element is in an incorrect orientation in said installed position,
    said blocking resisting installation of said pleated filter element onto said seal ledges when in said incorrectly installed position,
    wherein said at least one orientation rib is at least one pair of orientation ribs,
    each rib of said pair mounted to a different one of said sidewalls such that each rib is positioned and aligned to extend between a same set of said adjacent pleats of said filter element when said filter element is in said correctly installed position.

12. The filter housing of claim 11, wherein
    said orientation ribs are secured to said sidewalls by any of: adhesive, molding together with said sidewalls, clamping onto said sidewalls, or overmolding onto said sidewalls.

* * * * *